(12) United States Patent
Mori

(10) Patent No.: US 6,853,886 B2
(45) Date of Patent: Feb. 8, 2005

(54) METHOD OF ESTIMATING QUANTITIES THAT REPRESENT STATE OF VEHICLE

(75) Inventor: Atsushi Mori, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 62 days.

(21) Appl. No.: 10/289,680

(22) Filed: Nov. 6, 2002

(65) Prior Publication Data

US 2003/0089542 A1 May 15, 2003

(30) Foreign Application Priority Data

Nov. 15, 2001 (JP) ........................................ 2001-350699

(51) Int. Cl.⁷ .......................... G01P 15/00; B60T 8/00; B62D 6/00
(52) U.S. Cl. .............................. 701/1; 701/71; 701/74; 180/197
(58) Field of Search ............................. 701/1, 69, 71, 701/72, 74, 75; 180/197

(56) References Cited

U.S. PATENT DOCUMENTS

| | | | | |
|---|---|---|---|---|
| 4,872,116 A | * | 10/1989 | Ito et al. ........................ 701/41 |
| 5,711,023 A | * | 1/1998 | Eckert et al. .................. 701/70 |
| 6,015,192 A | * | 1/2000 | Fukumura ..................... 303/140 |
| 6,128,569 A | * | 10/2000 | Fukushima .................... 701/90 |
| 6,456,920 B1 | * | 9/2002 | Nishio et al. .................. 701/70 |

FOREIGN PATENT DOCUMENTS

JP          11 78933          3/1999

* cited by examiner

Primary Examiner—Michael J. Zanelli
Assistant Examiner—Eric M. Gibson
(74) Attorney, Agent, or Firm—Merchant & Gould P.C.

(57) ABSTRACT

A method is provided capable of improving the precision of estimating a vehicle body sideslip angle and values associated with the vehicle body sideslip angle using a simple and inexpensive method. The sideslip angle differential value unit calculates a vehicle body sideslip angle differential value by substituting a front wheel cornering power, which varies depending on the lateral acceleration output from the lateral acceleration sensor, detected values of the sensors, fixed physical quantities of the vehicle and known values, and the vehicle body sideslip angle calculated during the previous processing into a formula obtained by eliminating the rear wheel cornering power from an equation of equilibrium for the moment of the vehicle around the vertical axis and the equation of equilibrium for the force in the lateral direction of the vehicle.

7 Claims, 7 Drawing Sheets

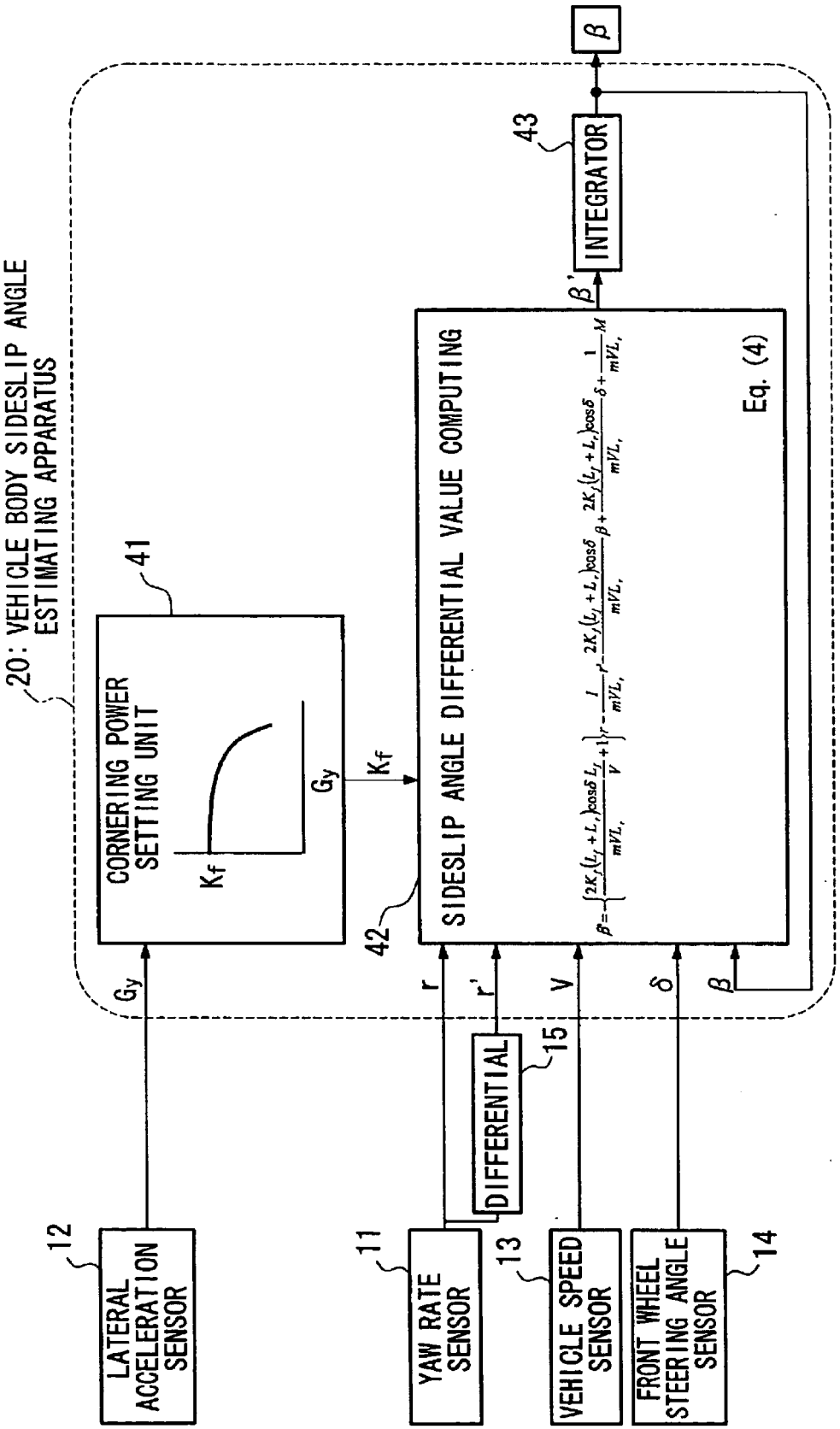

METHOD OF ESTIMATING QUANTITIES THAT REPRESENT STATE OF VEHICLE

BACKGROUND OF THE INVENTION

1. Field of the Invention

The present invention relates to a method for estimating quantities that represent the state of a vehicle, such as the vehicle body sideslip angle.

2. Description if the Related Art

Conventionally, a control method is known for improving the maneuverability of a vehicle by using the quantities that represent the vehicle state, such as the vehicle body sideslip angle β (that is, the angle between the forward direction of the vehicle and the longitudinal axis of the vehicle) when controlling the state of movement of the vehicle during a turning movement, for example. In this type of control, a method is known wherein, in the case that, for example, the vehicle body sideslip angle β is used, the yaw rate r detected by a yaw rate sensor (that is, the turn angle speed of the vehicle center of gravity around the axis in the vertical direction), the lateral acceleration $G_y$ detected by the lateral acceleration sensor (that is, the acceleration or deceleration added in the lateral direction of the vehicle), and the velocity V of the vehicle (vehicle speed) detected by the vehicle velocity sensor are substituted into the following equation 1, which is derived from the equation representing the physical relations of the quantities that represent the state of the movement of the vehicle, and by carrying out integration with respect to time, the vehicle body sideslip angle β is estimated.

However, in methods in which the results of the detected quantities from each of the sensors are integrated with respect to time, the influence of noise in each of the sensors, the error included in the results of the detected quantities, and the deviations in the calibrations of each of the sensors accumulate, and thus there is the concern that the precision of the estimation of the vehicle body sideslip angle β the deteriorates.

$$\beta = \int \left( \frac{G_y}{V} - r \right) dt \qquad \text{Eq. 1}$$

In response to these problems, the method of estimating the vehicle body sideslip angle and estimating apparatus disclosed, for example, in Japanese Unexamined Patent Application, First Publication, No. Hei 11-78933, is known. In this method, models of a plurality of wheels is introduced, and the vehicle body sideslip angle β is estimated by switching the model for the wheels depending on, for example, the case that the coefficient of friction of the road surface changes or the various conditions during travel in the critical vicinity of movement of the vehicle (that is, the critical zone in which there is the possibility that the state of movement of the vehicle may become unstable when there is no control of any kind).

However, in the vehicle body sideslip angle estimation method and estimation apparatus according to the example of conventional technology described above, there are the problems that the computation processing of the vehicle body sideslip angle β becomes complicated, and that the computation load increases.

Furthermore, there are cases in which the estimated value of the vehicle body sideslip angle β drastically changes due to the timing during which the models of a plurality of wheels is switched, and thus the there is a concern that the drivability will deteriorate.

In consideration of the problems described above, it is an object of the present invention to provide a method of estimating for the quantities representing the state of the vehicle that can improve the precision of the estimations of the vehicle body sideslip angle or values related to the vehicle body sideslip angle by a simple and inexpensive method.

SUMMARY OF THE INVENTION

In order to solve the problems and attain the objects described above, a first aspect of the method of estimating quantities that represent the vehicle state of the present invention comprises the steps of: detecting the yaw rate and vehicle speed (for example, step S 02 in the embodiment described below); and calculating equations (for example, equation 4 or equation 5 in the embodiment described below) for an equation of equilibrium (for example, equation 2 in the embodiment described below) for the force of the vehicle in the lateral direction and an equation of equilibrium (for example, equation 3 in the embodiment described below) for the moment around the vertical axis of the vehicle from which either the front wheel cornering power or the rear-wheel cornering power that has been eliminated, where the vehicle body sideslip angle, the front wheel cornering power, and the rear wheel cornering power are unknown quantities, and calculating the vehicle body sideslip angle β using the equations (for example, step S 02 to step S 03 in the embodiment described below).

According to the method of estimating the quantities that represent the vehicle state described above, based on an equation of equilibrium for the force in the lateral direction of the vehicle and an equation of equilibrium for the moment around the vertical axis of the vehicle obtained from a predetermined model of the movement of the wheels that describes the yaw movement of the vehicle in, for example, a two wheel model, it is possible to derive simultaneous equations comprising the three unknown quantities of the vehicle body sideslip angle, the front wheel cornering power, or the rear wheel cornering power by setting detected values from each of the sensors to the yaw rate and the vehicle speed. Here, for example, it is possible to estimate the vehicle body sideslip angle using a simple method that limits increases in the computation load while at the same time has a high precision by using the exactly necessary number of equations with respect to the number of unknown values to be calculated by substituting one of the suitable values of either the front wheel cornering power or the rear wheel cornering power.

In addition, a second aspect of the method of estimating the quantities that represent the vehicle state of the present invention comprises the steps of: detecting the yaw rate and vehicle speed (for example, step S 02 in the embodiment described below); calculating equations (for example, equation 14 or equation 15 in the embodiment described below) for an equation of equilibrium (for example, equation 12 in the embodiment described below) for the force of the vehicle in the lateral direction and an equation of equilibrium (for example, equation 13 in the embodiment described below) for the moment around the vertical axis of the vehicle from which either the front wheel cornering power or the rear wheel cornering power has been eliminated, where the vehicle body sideslip angle, the front wheel cornering power, and the rear wheel cornering power are unknown quantities, and calculating the speed of the vehicle in the lateral direction using the equations (for example, step S 02 to step S 03 in the embodiment described below); and calculating the vehicle body sideslip angle from the velocity of the vehicle in the lateral direction (for example, step S 03 in the embodiment described below).

According to the method of estimating the quantities that represent the vehicle state described above, based on an equation of equilibrium for the force in the lateral direction of the vehicle and an equation of equilibrium for the moment around the vertical axis of the vehicle obtained from a predetermined movement model of vehicles that describes the yaw movement of the vehicle in, for example, a two wheel model, it is possible to derive simultaneous equations comprising the two unknown quantities that represent the speed of the vehicle in the lateral direction, and the front wheel cornering power or the rear wheel cornering power by setting detected values from each of the sensors to the yaw rate and the vehicle speed and substituting an appropriate value of either, for example, the front wheel cornering power or the rear wheel cornering power. Here, it is possible to estimate the vehicle body sideslip angle using a simple method that limits increases in the computation load while at the same time has a high precision because it is possible to calculate unambiguously the vehicle body sideslip angle from the vehicle speed and the velocity in the lateral direction.

In addition, a third aspect of the method of estimating quantities that represent the vehicle state of the present invention comprises the steps of: detecting the yaw rate and vehicle speed (for example, step S 02 in the embodiment described below); and calculating equations (for example, equation 14 or equation 15 in the embodiment described below) for using an equation of equilibrium (for example, equation 8 in the embodiment described below) for the force of the vehicle in the lateral direction and an equation of equilibrium (for example, equation 9 in the embodiment described below) for the moment around the vertical axis of the vehicle from which either the front wheel tire lateral force or the rear wheel lateral force have been eliminated, where the vehicle body sideslip angle, the front wheel lateral force, and the rear wheel lateral force are unknown quantities, and calculating the vehicle body sideslip angle using the equations (for example, step S 02 to step S 03 in the embodiment described below).

According to the method of estimating the quantities that represent the vehicle state described above, based on an equation of equilibrium for the force in the lateral direction of the vehicle and an equation of equilibrium for the moment around the vertical axis of the vehicle obtained from a predetermined movement model of vehicles that describes the yaw movement of the vehicle in, for example, a two wheel model, it is possible to derive simultaneous equations comprising the two unknown quantities that represent the vehicle body sideslip angle, and the front wheel tire lateral force or the rear wheel tire lateral force by setting detected values from each of the sensors to the yaw rate and the vehicle speed and substituting an appropriate value of either, for example, the front wheel tire lateral force or the rear wheel tire lateral force. Here, it is possible to estimate the vehicle body sideslip angle using a simple method that limits increases in the computation load while at the same time has a high precision because it is possible to calculate unambiguously the vehicle body sideslip angle from the velocity and speed of the vehicle in the lateral direction.

In addition, a fourth aspect of the method of estimating quantities that represent the vehicle state of the present invention comprises the steps of: detecting the yaw rate (for example, the yaw rate r in the embodiment described below) and vehicle speed (for example, the vehicle speed V in the embodiment described below); calculating equations (for example, equations 4, 5, 14, 15, or 10 in the embodiment described below) for using an equation of equilibrium (for example, equation 2, 8, or 12 in the embodiment described below) for the force of the vehicle in the lateral direction and an equation of equilibrium (for example, equation 3, 9, or 13 in the embodiment described below) for the moment around the vertical axis of the vehicle from which eliminates either variables that determine the characteristics of the front wheels or variables that determine the characteristics of the rear wheels have been eliminated, where the values related to the vehicle body sideslip angle (for example, the vehicle body sideslip angle $\beta$ and the component $V_y$ of the lateral direction of the vehicle speed V in the embodiment described below), variables that determine the characteristics of the front wheel tire (for example, the front wheel cornering power $K_f$ or the coefficient of friction $\mu$ in the embodiment described below), and variables that determine the characteristics of the rear wheel tires (for example, the rear wheel cornering power $K_r$ or the coefficient of friction $\mu$ in the embodiment described below) are unknown quantities, and the values related to the vehicle body sideslip angle are calculated by the equations (for example, step S 02 to step S 03 in the embodiment described below).

According to the method of estimating the quantities that represent the vehicle state described above, based on an equation of equilibrium for the force in the lateral direction of the vehicle and an equation of equilibrium for the moment around the vertical axis of the vehicle obtained from a predetermined movement model of vehicles that describes the yaw movement of the vehicle in, for example, a two wheel model, it is possible to derive simultaneous equations comprising the two unknown quantities that represent the values related to the vehicle body sideslip angle, the variables that determine the characteristics of the front wheel tires, or the variables that determine the characteristics of the rear wheel tires by setting detected values from each of the sensors to the yaw rate and the vehicle speed. That is, it is possible to estimate the values related to the vehicle body sideslip angle using a simple method that limits increases in the computation load while at the same time has a high precision because by using the exactly necessary number of equations for an unknown number of equations that are to be calculated.

Furthermore, a fifth aspect of the method for estimating the quantities that represent the vehicle state of the present invention comprises the steps of: calculating the values related to the vehicle body sideslip angle by integrating the differential value of the values related to the vehicle body sideslip angle (for example step S 03 in the embodiment described below); and calculating the differential values of the values related to the vehicle body sideslip angle in the present processing using the values related to the vehicle body sideslip angle calculated in the previous processing (for example, step S 02 in the embodiment described below).

According to the method of estimating the quantities that represent the vehicle state described above, when calculating the differential value of the values related to the vehicle body sideslip angle, by using the values related to the vehicle body sideslip angle calculated in the previous processing, recursive calculation processing is carried out, and thus it is possible to prevent the values related to the vehicle body sideslip angle obtained by integrating with respect to time the differential values of the values related to the vehicle body sideslip angle from diverging.

That is, by repeating the recursive calculation processing, the values related to the vehicle body sideslip angle converge, and thus it is possible to prevent large fluctuations in the estimated values of the values related to the vehicle body sideslip angle, and guarantee the stability of the vehicle behavior control.

Furthermore, a sixth aspect of the method for estimating the quantities that represent the state of a vehicle of the present invention comprises the steps of: detecting the lateral acceleration; and using either the front wheel cornering power or the rear wheel cornering power, whichever has not been eliminated, based on the lateral acceleration (for example, step S 01 in the embodiment described below).

According to the method of estimating the quantities that represent the vehicle state described above, by using either the front wheel cornering power or the rear wheel cornering power, whichever has not been eliminated, based on the lateral acceleration, depending, for example, on the changes in the road surface, even in the case that either the front wheel cornering power or the rear wheel cornering power fluctuates drastically, the differential values of the values related to the vehicle body sideslip angle can be appropriately calculated.

BRIEF DESCRIPTION OF THE DRAWINGS

FIG. 4 is a functional block diagram showing an example of the processing flow in the vehicle body sideslip angle estimating apparatus shown in FIG. 1 and FIG. 2.

DESCRIPTION OF THE PREFERRED EMBODIMENT

Below, the method of estimation quantities that represent the vehicle state according to an embodiment of the present invention will be explained with reference to the drawings.

Figure 1:
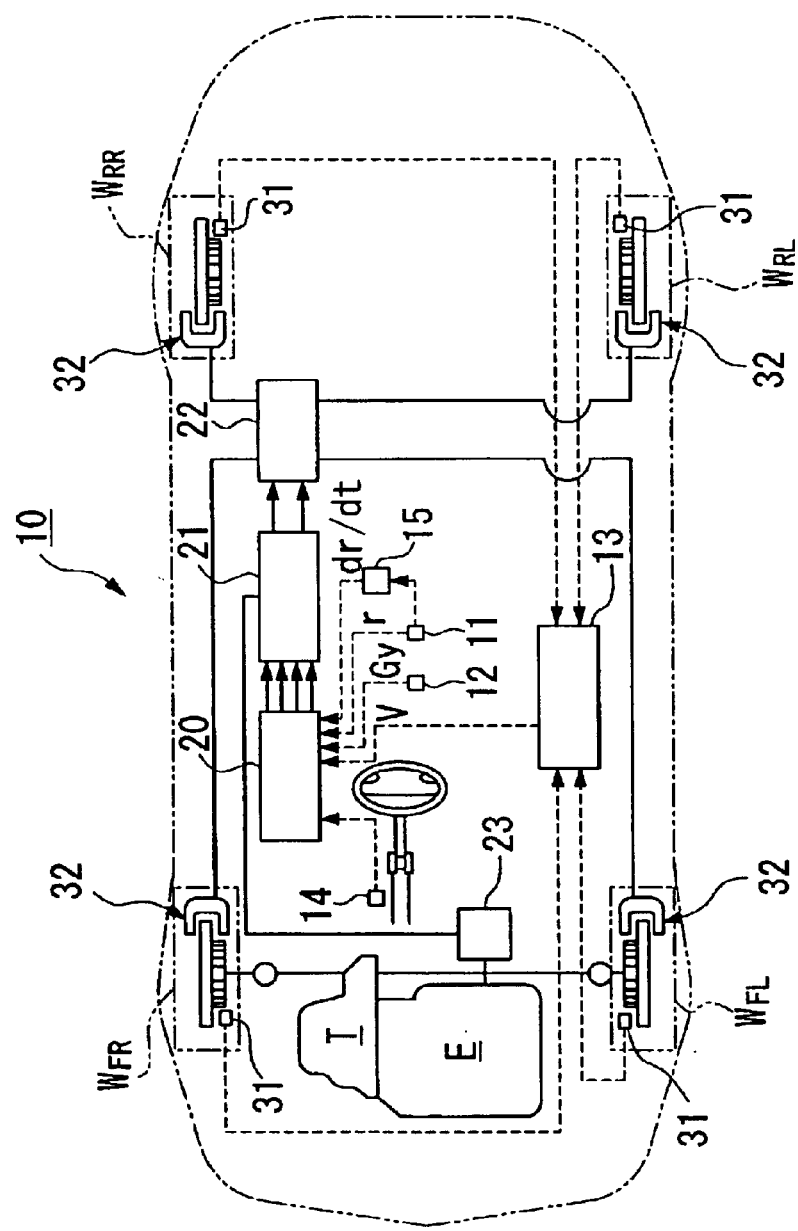
FIG. 1 is a structural diagram of the vehicle control system that realizes the method for estimating the quantities that represent the vehicle state according to an embodiment of the present invention.
Figure 2:
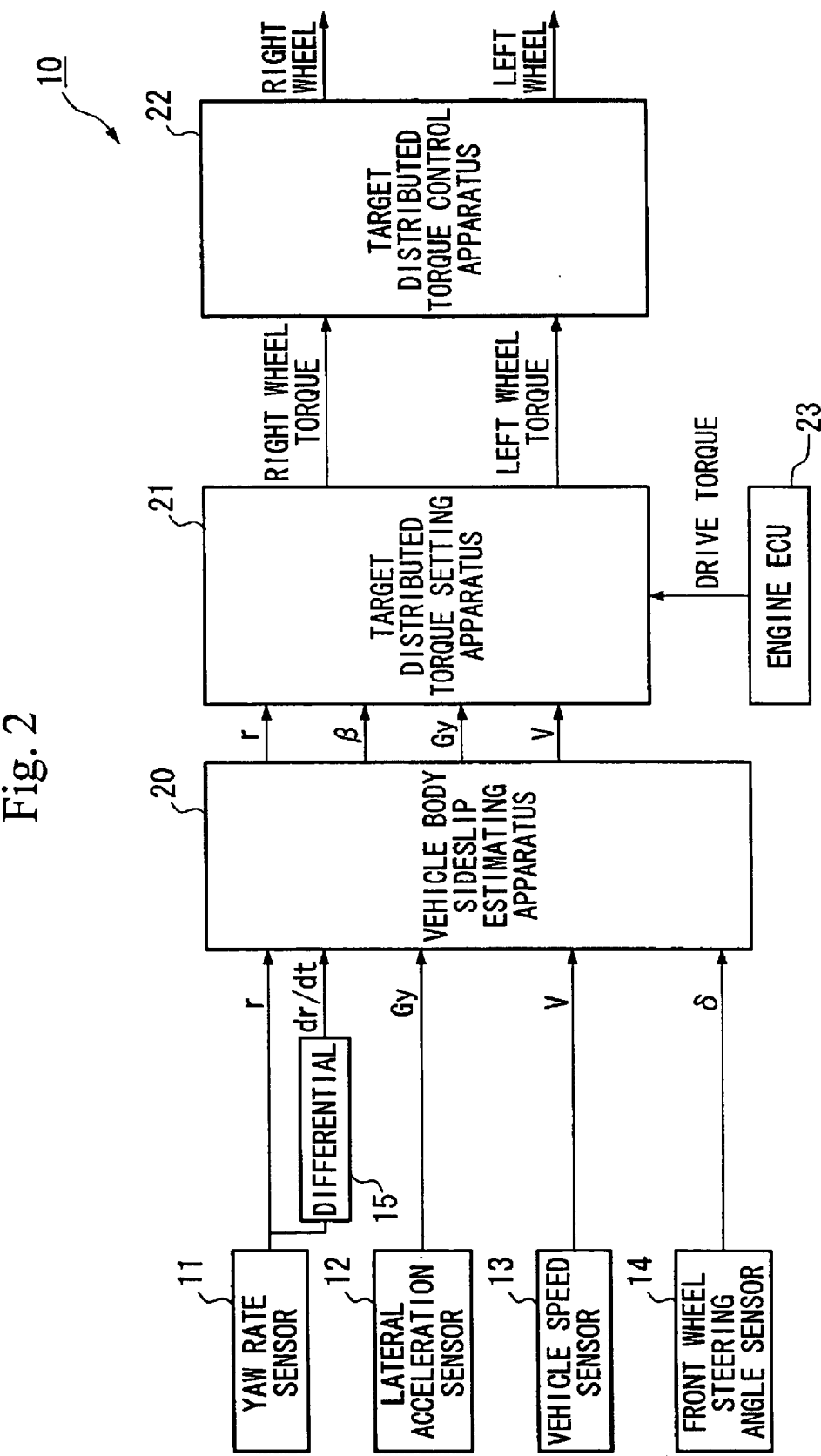
FIG. 2 is a structural diagram of the vehicle control system that realizes the method for estimating the quantities that represent the vehicle state according to an embodiment of the present invention.
Figure 3:
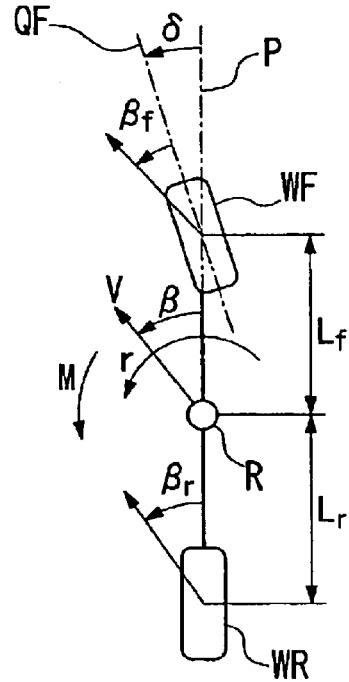
FIG. 3 is a schematic diagram showing a two wheel diagram in the two wheel model.

FIG. 1 and FIG. 2 are structural diagrams of the vehicle control system that realizes the method for estimating the quantities that represent the vehicle state according to an embodiment of the present invention; FIG. 3 is a schematic diagram showing a two wheel diagram in the two wheel model; FIG. 4 is a functional block diagram showing an example of the processing flow in the vehicle body sideslip angle estimating apparatus 20 shown in FIG. 1 and FIG. 2.

The vehicle control system 10 according to the present embodiment comprises, as shown for example in FIG. 1 and FIG. 2, a yaw rate sensor 11, a lateral acceleration sensor 12, a vehicle speed sensor 13, a front wheel steering angle sensor 14, a yaw rate differential value calculating unit 15, a vehicle body sideslip angle estimating apparatus 20, a target distributed torque setting apparatus 21, a target distributed torque control apparatus 21, and an engine ECU 23.

The yaw rate sensor 11 comprises a piezoelectric element, a gyro sensor, or the like, that detects the amount of the change in the angle of inclination with respect to the heading of the vehicle on a horizontal plane or a vertical direction, and a signal having a voltage level that depends on the size of the result of detecting the yaw rate r (that is, the turn angle speed of the vehicle center of gravity around the axis in the vertical direction) is output to a yaw rate differential value calculating unit 15 and a vehicle body sideslip angle estimating apparatus 20.

The lateral acceleration sensor 12 detects the lateral acceleration $G_y$, which is the acceleration (or deceleration) added in the lateral direction of the vehicle, and outputs the signal having a voltage level that depends on the detected result to the vehicle body sideslip angle estimating apparatus 20.

The vehicle speed sensor 13 detects the velocity V of the vehicle (vehicle speed V) from the velocities of each of the vehicle wheels (that is, the turn angle velocities of each of the vehicle's wheels) by a plurality of vehicle wheel speed sensors 31, . . . , 31 provided on each of the vehicle wheels $W_{FR}$, $W_{FL}$, $W_{RR}$, $W_{RL}$, and outputs a signal having a voltage level that depends on the size of this detected result to the vehicle body sideslip angle estimating apparatus 20.

The front wheel steering angle sensor 14 comprises a rotary encoder or the like provided, for example, on the steering axle, and by subtracting the steering angle, comprising the direction and size of the steering angle input by the driver, from the steering gear ratio of the front wheel steering system, the front wheel steering angle $\delta$ (that is, the angle $\delta$ formed between the longitudinal axis P of the vehicle and the longitudinal direction QF of the front wheels) is detected, and a signal having a voltage level that depends on the size of the detected result is output to the vehicle body sideslip angle estimating apparatus 20.

The vehicle body sideslip estimating apparatus 20 estimates the vehicle body sideslip angle $\beta$ (that is, the angle between the forward direction of the vehicle (for example, the direction of the vehicle speed V) and the longitudinal axis P of the vehicle) as a quantity that represents the vehicle state based on the following equations 2 and 3 according to the predetermined movement model of a vehicle (for example, the two wheel model), and outputs the estimated vehicle body sideslip angle $\beta$ to the target distributed torque setting apparatus 21.

The target distributed torque setting apparatus 21 sets the target value of the distributed torque that is distributed over the right and left front and rear wheels of the vehicle based on the vehicle body sideslip angle $\beta$ estimated in the vehicle body sideslip estimating apparatus 20, the yaw rate r of the vehicle detected by the yaw rate sensor 11, the lateral acceleration $G_y$ of the vehicle detected by the lateral acceleration sensor 12, the vehicle speed V detected by the vehicle speed sensor 13, and the drive torque calculated by the engine ECU 23, and outputs the calculated right wheel torque and left wheel torque to the target distributed torque control apparatus 22.

In addition, the target distributed torque control apparatus 22, for example, adds a driving force appropriate for each of the vehicle wheels $W_{FR}$, $W_{FL}$, $W_{RR}$, $W_{RL}$ or a desired yawing moment M by applying a damping force depending on the state of the operation of the vehicle. For example, the target distributed torque control apparatus 22 may carry out control so that a plurality of brake devices 32, . . . , 32 provided on each of the wheels $W_{FR}$, $W_{FL}$, $W_{RR}$, $W_{RL}$ are actuated, and the actual value of the each of the torques of the left and right wheels is equal to each of the target values of the right wheel torque and the left wheel torque.

$$mV(r + \beta') = -2K_f\left(\beta + \frac{L_f}{V}r - \delta\right) - 2K_r\left(\beta - \frac{L_r}{V}r\right) \quad \text{Eq. 2}$$

$$Ir' = -2K_f\left(\beta + \frac{L_f}{V}r - \delta\right)L_f + 2K_r\left(\beta - \frac{L_r}{V}r\right)L_r + M \quad \text{Eq. 3}$$

Here, among the movement models for the vehicle that describe the yaw movement of the vehicle, that is, the rotational movement of the center of gravity of the vehicle around the axis R in the vertical direction, as shown, for example, in FIG. 3, in a two wheel model in which it is assumed that the distance between the wheels of the vehicle is ignored, and the front and rear left and right wheels are respectively collapsed at the intersection between the longitudinal axis P of the vehicle and each of the vehicle axes, at the front wheels WF and the rear wheels WR, the lateral force and the cornering force are approximated to be equal, the cornering force is approximately proportional to the sideslip angles $\beta_f$ and $\beta_r$ of each tire, and furthermore, the vehicle body sideslip angle $\beta$ is approximated to be sufficiently small (for example, sin $\beta=\beta$, cos $\beta=1$), thereby the above equation 2 is derived as an equation of equilibrium for the power of the vehicle lateral direction and the above equation 3 is derived as the equation of equilibrium for the moment of the vehicle around the axis in the vertical direction (the axis R in the vertical direction of the center of gravity).

Here, in the equations 2 and 3 described above, the physical quantities that can be directly detected are the vehicle speed V, the yaw rate r, and the yaw rate differential value dr/dt (that is, the integrated with respect to time value of the yaw rate r: r'), and the front wheel steering angle $\delta$, and the fixed physical quantities of the vehicle are the total mass m of the vehicle, the distance $L_f$ from the center of gravity of the vehicle to the axle of the front wheel, the distance $L_r$ from the center of gravity of the vehicle to the axle of the rear wheel, and the yawing inertial moment I. When these values and the yawing moment M, which is already known, are treated as constants, equations 2 and 3 described above constitute a three variable simultaneous differential equation comprising the vehicle body sideslip angle $\beta$, the front wheel cornering power $K_f$, and the rear wheel cornering power $K_r$.

That is, each of the cornering powers $K_r$ and $K_r$ that are a proportion of the cornering force with respect to the sideslip $\beta_f$ and $\beta_r$ of each tire must be treated as variables because they change depending on the state of the turning movement of the vehicle and the state of the road surface (for example, a dry asphalt surface, a snow covered surface, or the like).

Thus, each of the detected signals of the yaw rate r of the vehicle detected by the yaw rate sensor 11, the yaw rate differential r' calculated in the yaw rate differential value calculation unit 15, the lateral acceleration $G_y$ detected in the lateral acceleration sensor 12, the vehicle speed V detected in the vehicle speed sensor 13, and the front wheel steering angle $\delta$ detected by the front wheel steering angle sensor 14 are input into the vehicle body sideslip angle estimating apparatus 20.

At this time, the vehicle body sideslip angle estimating apparatus 20 calculates the vehicle body sideslip angle $\beta$ by integrating with respect to time the vehicle body sideslip angle differential value d$\beta$/dt (that is, the time differential value of the vehicle body sideslip angle: $\beta$'), as described below, and does not calculate the vehicle body sideslip angle $\beta$ based on the equation 1 described above as one example of the conventional technology.

As shown, for example, in FIG. 4, the vehicle body sideslip angle estimating apparatus 20 comprises the cornering power setting unit 41, the sideslip angle differential value computing unit 42, and an integrator 43.

Figure 5:
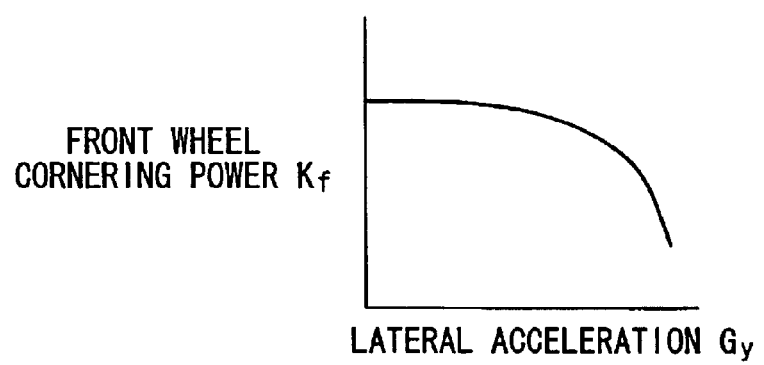
FIG. 5 is a graph showing the front wheel cornering power $K_f$ that changes depending on the lateral acceleration $G_y$ of the vehicle.
Figure 6:
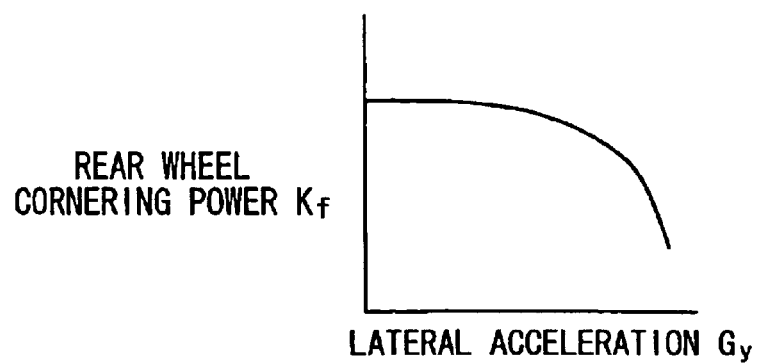
FIG. 6 is a graph showing the rear wheel cornering power $K_r$ that changes depending on the lateral acceleration $G_y$ of the vehicle.

Depending on the computation processing in the sideslip angle differential value computing device 42 described below, the cornering power setting unit 41 uses either the front wheel cornering power $K_f$ or the rear wheel cornering power $K_r$ based on the lateral acceleration $G_y$ of the vehicle, and supplies the result to the sideslip angle differential value computing unit 42. Here, as shown for example in FIG. 5 and FIG. 6, the cornering power setting unit 41 provides in advance a map showing the front wheel cornering power $K_f$ and the rear wheel cornering power $K_r$, which change depending on the lateral acceleration $G_y$ of the vehicle.

The sideslip angle differential value computing unit 42 calculates the vehicle body sideslip angle differential value $\beta$' based on the either the front wheel cornering power $K_r$ or the rear wheel cornering power $K_r$ input from the cornering power setting unit 41 and the equations 2 and 3 described above.

Here, the sideslip angle differential value computing unit 42, for example, calculates the vehicle body sideslip angle differential value $\beta$' by substituting the front wheel cornering power $K_r$ input from the cornering power setting unit 41; the constant vehicle speed V, the yaw rate r, the yaw rate differential value r', the front wheel steering angle $\delta$, the distance $L_f$ from the center of gravity of the vehicle to the front wheel axle, the distance $L_r$ from the center of gravity of the vehicle to the rear wheel axle, the yawing inertial moment I, the yawing moment M, and the total mass m of the vehicle; and the vehicle body sideslip angle $\beta$ input from the integrator 43 described below into the following equation 4, which is an equation obtained by eliminating the rear wheel cornering power $K_r$ from the above equations 2 and 3 and solved to obtain the vehicle body sideslip angle differential value $\beta$'. The vehicle body sideslip angle differential value $\beta$' calculated here is input into the integrator 43. Moreover, in the first computation, the vehicle body sideslip angle $\beta$ is zero.

$$\beta' = -\left\{\frac{2K_f(L_v + L_r)\cos\delta}{mVL_r}\frac{L_f}{V} - 1\right\}r - \frac{I}{mVL_r}r' - \frac{2K_f(L_f + L_r)\cos\delta}{mVL_r}\beta + \frac{2K_f(L_f + L_r)\cos\delta}{mVL_r} + \frac{1}{mVL_r}M \quad \text{Eq. 4}$$

The integrator 43 calculates the vehicle body sideslip angle $\beta$ by integrating with respect to time the vehicle body sideslip angle differential value $\beta$' input from the sideslip angle differential value computing unit 42, and the result is input into the target distributed torque setting apparatus 21 and the sideslip angle differential value computing unit 42. That is, the vehicle body sideslip angle β calculated here is used in the calculation of the vehicle body sideslip angle differential value β' from the next computation process in the sideslip angle differential value computing unit 42.

The vehicle control system 10 in the present embodiment provides the structure described above. Next, the operation of this vehicle control system 10 will be explained. In particular, the processing that estimates the vehicle body sideslip angle β as a quantity that represents the vehicle state will be explained.

First, in step S 01, the front wheel cornering power $K_f$ input to the sideslip angle differential value computing unit 42 is set according to the lateral acceleration $G_y$ input from the lateral acceleration sensor 12.

Next, in step S 02, the vehicle body sideslip angle differential value β' is calculated using the above equation 4 based on the result of detected quantities input from each of the sensors 11, 13, and 14, preset physical quantities, or the like.

Then, in step S 03, the vehicle body sideslip angle β is calculated by integrating with respect to time the vehicle body sideslip angle differential value β', and this vehicle body sideslip angle β is used in the calculation of the vehicle body sideslip angle differential value β' in the above step S 02 in the next sequence of computing processes. Next, the processing returns to the above step S 01, and for example, the processing following step S 01 is executed after a predetermined time interval.

As described above, according to the method of estimating quantities that represent the vehicle state according to the present embodiment, it is possible to estimate the vehicle body sideslip angle β with a simple method that limits increases in the computation load and has at the same time high precision by computing the vehicle body sideslip angle β from two unknowns, the vehicle body sideslip angle β and the rear wheel cornering power $K_r$, by using the value of the front wheel cornering power $K_f$ obtained depending on the lateral acceleration $G_y$ from a predetermined map and the equation of equilibrium 2 for the force of the vehicle in the lateral direction and the equation of equilibrium 3 for the moment of the vehicle around the vertical axis.

That is, compared to the case of directly integrating the result of detected quantities such as the lateral acceleration $G_y$ output from the lateral acceleration sensor 23 that include errors, like the example of the conventional technology described above, it is possible to limit the increase in accumulated errors.

In this case, due to setting the front wheel cornering power $K_f$ depending on the lateral acceleration $G_y$, even in the case that, for example, the characteristics of each tire change depending on changes in the road surface or the like while traveling, it is possible to prevent a decrease in the precision of the estimation of the vehicle body sideslip angle β.

In addition, when calculating the vehicle body sideslip differential value β', by using the vehicle body sideslip angle β calculated in the previous processing, it is possible to prevent the vehicle body sideslip angle β obtained by integrating with respect to time the vehicle body sideslip angle differential value β' from diverging due to carrying out recursive calculation processing.

That is, by repeating the recursive calculation process, the vehicle body sideslip angle β will converge, and thus it is possible to prevent drastic fluctuations in the estimated value of the vehicle body sideslip angle β, and it is possible to guarantee the stability of the vehicle behavior control.

Figure 7:
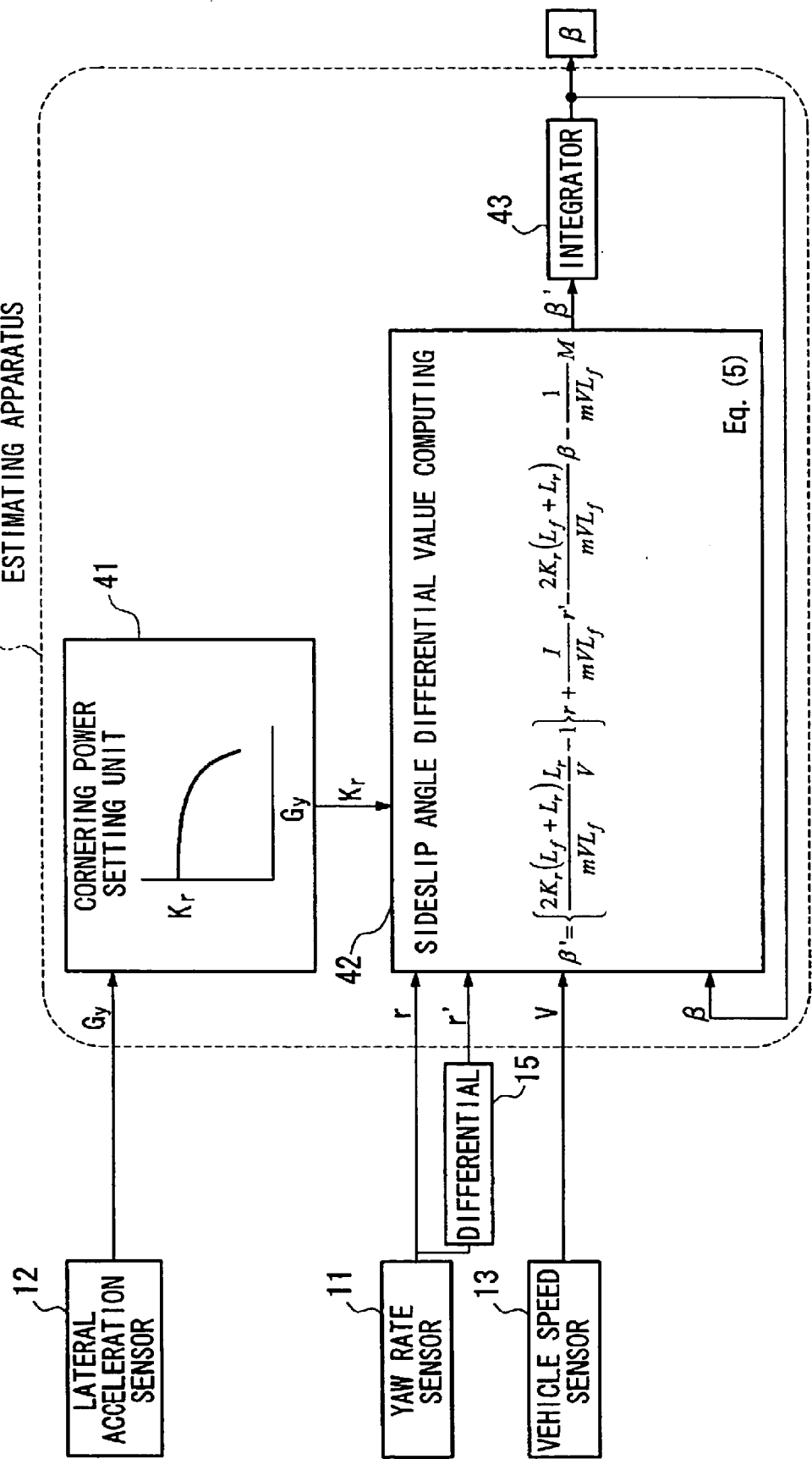
FIG. 7 is a functional block diagram showing the flow of processing according to a first modification of the vehicle body sideslip angle estimating apparatus shown in FIG. 1 and FIG. 2.

Next, the method of estimating the quantities that represent the vehicle state according to a first modification of the embodiment described above will be explained with reference to the attached figures. FIG. 7 is a functional block diagram showing the flow of processing according to a first modification of the vehicle body sideslip angle estimating apparatus 20 shown in FIG. 1 and FIG. 2.

Moreover, below the explanation of the parts that are identical to those of the embodiment described above are abbreviated or omitted.

The major point of difference between this first modification and the embodiment described above is the content of the computing processing for the sideslip angle differential value computing unit 42. Here, when calculating the vehicle body sideslip angle β, the front wheel steering angle δ is not necessary, and thus the front wheel steering angle sensor 14 can be omitted.

Specifically, the sideslip angle differential value computing unit 42 according to this first modification calculates the vehicle body sideslip angle differential value β' by substituting the rear wheel cornering power $K_r$ input from the cornering power setting unit 41; the constants vehicle speed V, yaw rate r, yaw rate differential value r', the distance $L_f$ from the center of gravity of the vehicle to the front wheel axle, the distance $L_r$ from the center or gravity of the vehicle to the rear wheel axle, the yawing inertial moment I, the yawing moment M, and the total mass of the vehicle; and the vehicle body sideslip angle β input from the integrator 43 into the following equation 5, which is an equation obtained by eliminating the front wheel cornering power $K_f$ from the above equations 2 and 3 and solved to obtain the vehicle body sideslip angle differential angle value β'.

$$\beta' = \left\{ \frac{2K_r(L_f + L_r)}{mVL_f} \frac{L_r}{V} - 1 \right\} r + \frac{I}{mVL_f} r' - \frac{2K_r(L_f + L_r)}{mVL_f} \beta - \frac{1}{mVL_f} M \quad \text{Eq. 5}$$

Thus, in this first modification, in the sequence of processing of step S 01 to step S 03 in the embodiment described above, in step S 01, the rear wheel cornering power $K_r$ is set. Next, in step S 02, the vehicle body sideslip angle differential value β' is calculated using the above equation 5.

As described above, according to the method of estimating the quantities that represent the vehicle state according to the first modification of the present embodiment, because the front wheel steering angle is unnecessary, it is possible to eliminate the front wheel steering angle sensor 14, and without decreasing the precision of the estimation of the vehicle body sideslip angle β, it is possible to further simplify the structure of the vehicle control system 10 and the computation processing.

Figure 8:
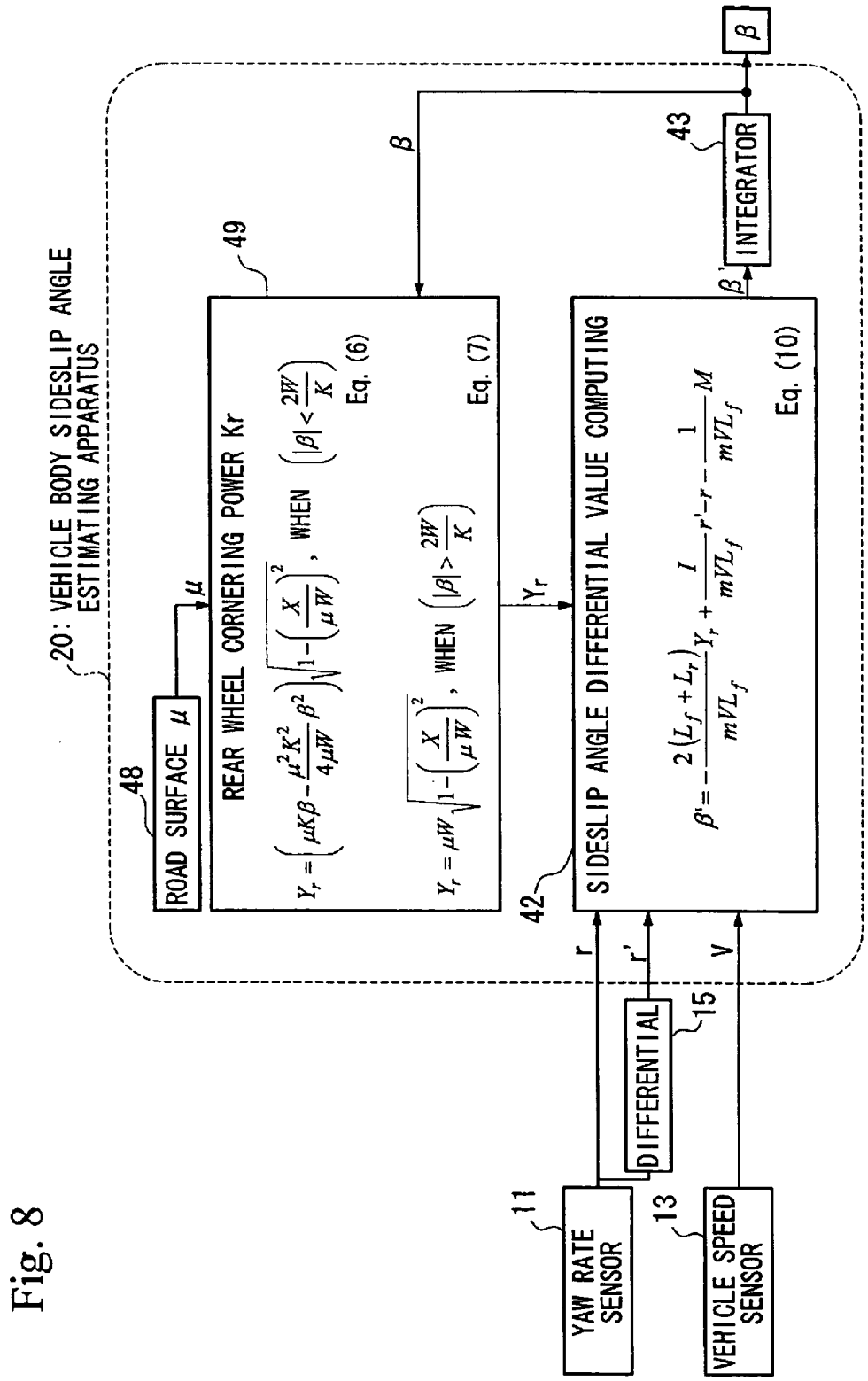
FIG. 8 is a functional block diagram showing the flow of processing according to a second modification of the vehicle body sideslip angle estimating apparatus shown in FIG. 1 and FIG. 2.

Next, the method of estimating the quantities that represent the vehicle state according to a second modification of the present embodiment described above will be explained with reference to the attached figures. FIG. 8 is a functional block diagram showing the flow of processing according to a second modification of the vehicle body sideslip angle estimating apparatus 20 shown in FIG. 1 and FIG. 2.

Moreover, below the explanation of the parts that are identical to those of the embodiment described above are abbreviated or omitted.

In this second modification, the equation of equilibrium for the force in the lateral direction of the vehicle and the equation of equilibrium for the moment of the vehicle around the vertical axis is represented based on the lateral force $Y_f$ that acts on the front wheels WF (that is, each of the wheels $W_{FR}$ and $W_{FL}$) and the lateral force $Y_r$ that acts on the rear-wheels (that is, each of the wheels $W_{RR}$ and $W_{RL}$). In addition, the lateral forces $Y_r$ and $Y_r$ are represented based on equations related to variables (for example, the coefficient of friction $\mu$ between each of the tires and the road surface) that determine the characteristics of the front wheel tires and the rear wheel tires by using a predetermined tire dynamics model.

Specifically, the main point that differs from the embodiment described above is that the vehicle body sideslip angle differential value $\beta'$ is calculated, for example, with the coefficient of friction $\mu$ between each of the tires and the road surface serving as a variable instead of each of the cornering powers $K_f$ and $K_r$ serving as variables.

The vehicle body sideslip angle estimating apparatus 20 according to this second modification comprises a sideslip angle differential value computing unit 42, an integrator 43, a lateral acceleration estimating unit 44, a subtractor 45, a PID regulator 46, an adder 47, a tire characteristic variable input unit 48, and a tire lateral force computing unit 49.

Specifically, instead of the cornering power setting unit 41 in the embodiment described above, the provided tire characteristic variable input unit 48 inputs the variables (for example, the coefficient of friction $\mu$ between each of the tires and the road surface) that determine the characteristics of the front wheel tires and the rear wheel tires to the tire lateral force calculating unit 49.

The tire lateral force computing unit 49 calculates the lateral force $Y_r$ applied to the rear wheel tires based on the following equations 6 and 7 derived, for example, from a predetermined tire dynamics model, and outputs the result to the sideslip angle differential value computing unit 42.

$$Y_r = \left(\mu K \beta - \frac{\mu^2 K^2}{4\mu W}\beta^2\right)\sqrt{1-\left(\frac{X}{\mu W}\right)^2}, \left(|\beta| < \frac{2W}{K}\right) \quad \text{Eq. 6}$$

$$Y_r = \mu W \sqrt{1-\left(\frac{X}{\mu W}\right)^2}, \left(|\beta| > \frac{2W}{K}\right) \quad \text{Eq. 7}$$

Here, in the above equations 6 and 7, the ground load W is a value found from the value that is the measured value of the vehicle load corrected by the longitudinal and lateral acceleration, or the output of the load cell provided on the suspension system, and the cornering power K is the value found from a predetermined map set in advance, comprising, for example, preset and predetermined maps of the cornering power, which change depending on the coefficient of friction $\mu$, the ground load W, or the like. Furthermore, the longitudinal force X is a value estimated from the acceleration (or deceleration) or the like, or, for example, found from the damping hydraulic pressure or the engine output. In addition, the vehicle body sideslip angle $\beta$ is a value input from the integrator 43, and is zero in the first computation. Depending on the value of this vehicle body sideslip angle $\beta$, the lateral force $Y_r$ that is applied to the rear wheel tires is calculated by one of either of the above equations 6 or 7.

The sideslip angle differential value computing unit 42 according to this second modification calculates the vehicle body sideslip angle differential value $\beta'$ by using the following equation 10, in which the equation obtained by eliminating the lateral force $Y_f$ applied, for example, to the front wheels WF, and solved to obtain the vehicle body sideslip angle differential value $\beta'$, based on the following equations 8 and 9 obtained when representing the equation of equilibrium for the force in the lateral direction of the vehicle and the equation of equilibrium of the moment of the vehicle around the vertical axis based on the lateral force $Y_f$ applied to the front wheel tires and the lateral force $Y_r$ applied to the rear wheel tires.

Specifically, in the following equation 10, the physical quantities that can be directly measured are the vehicle speed V, the yaw rate r, and the yaw rate differential value r', and the fixed physical quantities of the vehicle are the total mass of the vehicle m, the distance $L_f$ from the center of gravity of the vehicle to the front wheel axle, and distance $L_r$ from the center of gravity of the vehicle to the rear wheel axle, and the yawing inertial moment I. These values and the already known yawing moment M are treated as constants, and the vehicle body sideslip angle differential value $\beta'$ is calculated by using the lateral force $Y_r$ input from the tire lateral force computing unit 49.

$$mV(r+\beta') = -2Y_f - 2Y_r \quad \text{Eq. 8}$$

$$Ir' = -2Y_f L_f + 2Y_r L_r + M \quad \text{Eq. 9}$$

$$\beta' = -\frac{2(L_f + L_r)}{mVL_f}Y_r + \frac{I}{mVL_f}r' - r - \frac{1}{mVL_f}M \quad \text{Eq. 10}$$

Thus, in this second modification, in the sequence of processing of step S 01 to step S 03 in the embodiment described above, in step S 01, a predetermined coefficient of friction $\mu$ (for example, the value of the first approximation or the like) input from the tire characteristic variable input unit 48 and the lateral force $Y_r$ applied to the rear wheels WR obtained from the above equations 6 and 7 are calculated.

Next, in step S 02, the vehicle body sideslip angle differential value $\beta'$ is calculated by the above equation 10.

Next, in step S 03, the vehicle body sideslip angle $\beta$ is calculated by integrating with respect to time the vehicle body sideslip angle differential value $\beta'$, and this vehicle body sideslip angle $\beta$ is used in the calculation of the lateral force $Y_r$ applied to the rear wheels WR in the above step S 01 in the next sequence of computation processing. Next, the processing returns to the above step S 01, and executes the processing following step S 01, for example, after a predetermined time interval.

Moreover, in this second modification, another tire dynamics model can be used that describes the lateral forces $Y_f$ and $Y_r$ without the ground load W or longitudinal force X serving as variables.

In addition, the coefficient of friction $\mu$ input into the tire lateral force computing unit 49 is not limited to a predetermined constant, but can be a variable value that depends, for example, on the condition of the road surface or the like.

In addition, in this second modification, the lateral force $Y_r$ applied to the rear wheel tires is calculated by the tire lateral force computing unit 49 and the vehicle body sideslip angle differential value $\beta'$ is calculated by the sideslip angle differential value computing unit 42 based on the lateral force $Y_r$ applied to the rear wheel tires. However, this is not limiting. For example, it is possible to calculate by the tire lateral force computing unit 49 the lateral force $Y_f$ applied to the front wheel tires, and then calculate the vehicle body sideslip angle differential value $\beta'$ by an equation obtained by eliminating the lateral force $Y_r$ applied to the rear wheel tires from the above equations 8 and 9, and solved to obtain the vehicle body sideslip angle differential value $\beta'$ by the sideslip angle differential value computing unit 42.

As described above, according to the method of estimating qualities that represent the state of a vehicle according to the second modification of the present embodiment, the variables that determine the characteristics of the front wheel and rear-wheel tires are not limited to the front wheel cornering power $K_f$ and the rear wheel corning power $K_r$, but depending on the control content of the vehicle, for example, it is possible to use appropriate variables such as the coefficient of friction $\mu$ between each of the tires and the road surface, and it is possible to diversify the control equations of the vehicle easily.

Furthermore, it is possible to introduce a tire dynamics model according to either one of the rear wheel tires or the front wheel tires, and compared to the case of introducing a tire dynamics model for both the rear wheel tires and the front wheel tires, the deterioration of the precision of the estimation that originate in the modeling can be limited.

Moreover, in the present embodiment and the first and second modifications described above, as shown, for example, in the following equation 11, the vehicle body sideslip angle $\beta$ can be represented by the $V_x$ component of the vehicle speed V in the direction of the longitudinal axis P and the $V_y$ component of the perpendicular lateral direction, and furthermore, it is possible to modify the above equations 2 and 3 to the following equations 12 and 13 by making an approximation when the vehicle body sideslip angle $\beta$ is small enough (for example, $V=V_x$). Thereby, as a quantity representing the state of the vehicle, the $V_y$ component of the vehicle speed V in the lateral direction can be estimated instead of the vehicle body lateral sideslip angle $\beta$.

Moreover, in this case, the speed of the rear wheel WR in the two wheel model can be approximated by the $V_x$ component of the vehicle speed V in the direction of the longitudinal axis P.

$$\beta = \operatorname{atan}\left(\frac{V_y}{V_x}\right) \quad \text{Eq. 11}$$

$$m(V_y' + rV_x) = \\ -2K_f\left\{\operatorname{atan}\left(\frac{V_y + L_f r}{V_x}\right) - \delta\right\} - 2K_r\left\{\operatorname{atan}\left(\frac{V_y - L_f r}{V_x}\right)\right\} \quad \text{Eq. 12}$$

$$Ir' = \\ -2K_f\left\{\operatorname{atan}\left(\frac{V_y + L_f r}{V_x}\right) - \delta\right\}L_f + 2K_r\left\{\operatorname{atan}\left(\frac{V_y - L_f r}{V_x}\right)\right\}L_r + M \quad \text{Eq. 13}$$

Figure 9:
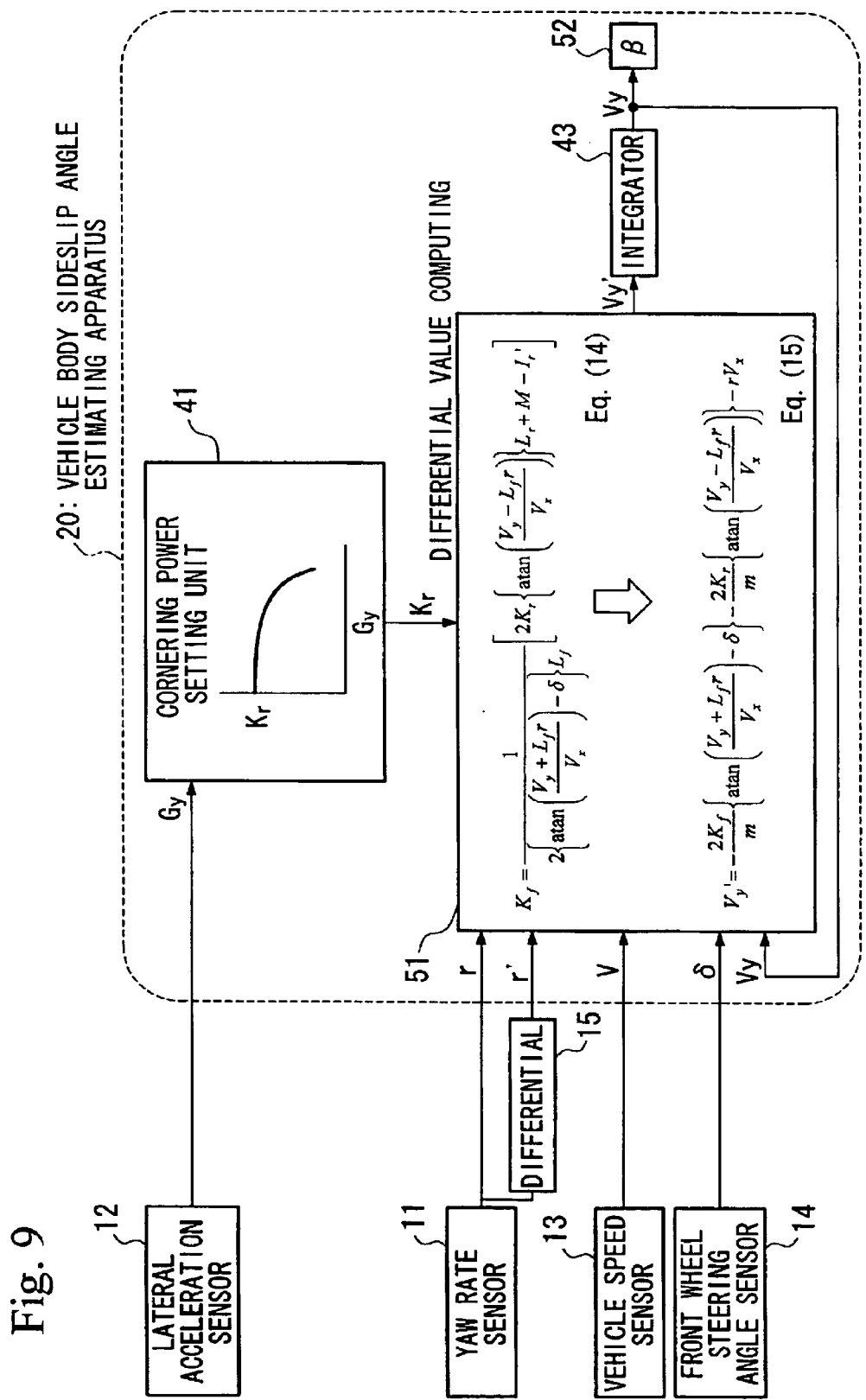
FIG. 9 is a functional block diagram showing the flow of processing according to a third modification of the vehicle body sideslip angle estimating apparatus shown in FIG. 1 and FIG. 2.

For example, in the vehicle body sideslip angle estimating apparatus 20 according to a third modification of the present embodiment described above, as shown in FIG. 9, a differential value computing unit 51 is provided instead of the sideslip angle differential value computing unit 42, and in this differential value computing unit 51, first the front wheel cornering power $K_f$ is calculated based on the following equation 14, in which the above equation 13 is solved to obtain the front wheel cornering power $K_f$. In addition, the differential value $V_y'$ is estimated based on the following equation 15, in which the above equation 12 is solved to obtain the differential value $dV_y/dt$ (that is, the time differential value of the $V_y$ component in the lateral direction: $V_y'$) of the $V_y$ component of the vehicle speed V in the lateral direction, and the result is input to the integrator 43.

$$K_f = \frac{1}{2\left\{\operatorname{atan}\left(\frac{V_y + L_f r}{V_x}\right) - \delta\right\}L_f}\left[2K_r\left\{\operatorname{atan}\left(\frac{V_y - L_f r}{V_x}\right)\right\}L_r + M - I_r\right] \quad \text{Eq. 14}$$

$$V_y' = -\frac{2K_f}{m}\left\{\operatorname{atan}\left(\frac{V_y + L_f r}{V_x}\right) - \delta\right\} - \frac{2K_r}{m}\left\{\operatorname{atan}\left(\frac{V_y - L_f r}{Vx}\right)\right\} - rV_x \quad \text{Eq. 15}$$

Here, the integrator 43 calculates the $V_y$ component in the lateral direction by integrating with respect to time the differential value $V_y'$, and at the same time, the $V_y$ component in the lateral direction calculated here is used in the calculation of the differential value $V_y'$ in the next computing processing by the differential value computing unit 51.

In addition, the vehicle body sideslip angle calculating unit 52 provided in the vehicle body sideslip angle estimating apparatus 20 calculates the vehicle body sideslip angle $\beta$ using the above equation 11 based on the $V_y$ component in the lateral direction calculated by the integrator 43.

Thereby, in this third modification, in the sequence of processing in step S 01 to step S 03 in the embodiment described above, in step S 01, the rear wheel cornering power $K_r$ input into the differential value computing unit 51 is set. In addition, in step S 02, the differential value $V_y'$ is calculated by the above equations 14 and 15.

Next, in step S 03, the $V_y$ component in the lateral direction is calculated by integrating with respect to time the differential value $V_y'$, and the $V_y$ component in the lateral direction is used in the calculation of the differential value $V_y'$ in the above step S 02 in the next sequence of computation processing. At the same time, the vehicle body sideslip angle $\beta$ is calculated using the above equation 11. Then the processing returns to step S 01, and the processing following step S 01 is executed, for example, after a predetermined time interval.

Moreover, in the first through third modifications of the present embodiment described above, the desired yawing moment M was applied to the vehicle by applying the appropriate drive power or braking force to each of the wheels $W_{FR}$, $W_{FL}$, $W_{RR}$, $W_{RL}$, but this is not limiting. For example, the yawing moment M can be omitted.

In addition, in the first through third modifications of the present embodiment described above, as shown in FIG. 3, only a vehicle in which the steering angle of the rear wheels WR was zero and only the front vehicle wheels $W_{FR}$ and $W_{FL}$ are steered was the object of the invention, but this is not limiting. For example, a rear wheel steering angle sensor that detects the rear wheel steering angle (that is, the angle between the longitudinal axis P of the vehicle and the longitudinal direction QR of the rear wheels) can be provided, and the vehicle body sideslip angle $\beta$ can be calculated based on the equation of equilibrium of the force in the lateral direction of the vehicle and the equation of equilibrium of the moment of the vehicle around the vertical axis that include the rear steering angle can be calculated.

In addition, in the present embodiment described above and the third modification, the front wheel steering angle sensor 14 detects the front wheel steering angle $\delta$ by dividing the steering angle, which comprises the direction and size of the steering angle input by the driver, by the steering gear ratio of the front wheel steering system, but this is not limiting. For example, the front wheel steering angle $\delta$ can be directly detected.

As explained above, according to the first aspect of the method of estimating the quantities that represent the vehicle state described above, it is possible to estimate the vehicle body sideslip angle with a simple method that limits increases in the computing load while providing high precision by using simultaneous equations, or specifically, two equations, the equation of equilibrium of the force of the vehicle in the lateral direction and the equation of equilibrium for the moment of the vehicle around the vertical axis, with three unknowns, the vehicle body sideslip angle, the front wheel cornering power, and the rear wheel cornering power, and, and substituting, for example, either one of the appropriate values of the front wheel cornering power or the rear wheel cornering power.

In addition, according to the second aspect of the method of estimating the quantities that represent the vehicle state described above, it is possible to estimate the vehicle body sideslip angle with a simple method that limits increases in the computing load while providing high precision by using simultaneous equations, or specifically, two equations, the equation of equilibrium of the force of the vehicle in the lateral direction and the equation of equilibrium for the moment of the vehicle around the vertical axis, with three unknowns, the velocity of the vehicle in the lateral direction, the front wheel cornering power, and the rear wheel cornering power, and, and substituting, for example, either one of the appropriate values of the front wheel cornering power or the rear wheel cornering power.

In addition, according to the third aspect of the method of estimating the quantities that represent the vehicle state described above, it is possible to estimate the vehicle body sideslip angle with a simple method that limits increases in the computing load while providing high precision by using simultaneous equations, or specifically, two equations, the equation of equilibrium of the force of the vehicle in the lateral direction and the equation of equilibrium for the moment of the vehicle around the vertical axis, with three unknowns, the vehicle body sideslip angle, the front wheel tire lateral force, and the rear wheel tire lateral force, and, and substituting, for example, either one of the appropriate values of the front wheel lateral force or the rear wheel lateral force.

In addition, according to the fourth aspect of the method of estimating the quantities that represent the vehicle state described above, it is possible to estimate the vehicle body sideslip angle with a simple method that limits increases in the computing load while providing high precision by using simultaneous equations, or specifically, two equations, the equation of equilibrium of the force of the vehicle in the lateral direction and the equation of equilibrium for the moment of the vehicle around the vertical axis, with three unknowns, the values related to vehicle body sideslip angle, the variables that determine the characteristics of the front wheel tires, and the variables that determine the characteristics of the rear wheel tires, and, and substituting, for example, either one of the appropriate values of the variables that determine the characteristics of the front wheel tires, and the variables that determine the characteristics of the rear wheel tires.

Furthermore, according to a fifth aspect of the method of estimating the quantities that represent the vehicle state described above, it is possible to prevent divergence of the values of the vehicle body sideslip angle obtained by integrating with respect to time the differential value of the values related to the vehicle body sideslip angle by carrying out recursive calculation processing using the value related to the vehicle body sideslip angle calculated in the previous processing when calculating the differential value of the value related to the vehicle body sideslip angle.

Furthermore, according to a sixth aspect of the method of estimating the quantities that represent the vehicle state described above, it is possible to calculate appropriately the differential value of the value related to the vehicle body sideslip angle even in the case that either one of the front wheel cornering power or the rear wheel cornering power fluctuates drastically depending, for example, on changes in the road surface, by using wither the front wheel cornering power or the rear wheel cornering power based on the lateral acceleration.

What is claimed is:

1. A method of estimating quantities that represent the state of a vehicle, comprising the steps of:
   detecting a yaw rate and vehicle speed; and
   calculating an equation by eliminating either one of unknown quantities of a front wheel cornering power and a rear-wheel cornering power from two equations, including said unknown quantities, comprising an equation of equilibrium for the force in the lateral direction of the vehicle and an equation of equilibrium for the moment around the vertical axis of the vehicle, and calculating a vehicle body sideslip angle using said obtained equation.

2. A method for estimating quantities that represent the state of the vehicle according to claim 1, comprising the steps of:
   detecting the lateral acceleration; and
   changing either said front wheel cornering power or said rear wheel cornering power, whichever has not been eliminated, based on said lateral acceleration.

3. A method of estimating quantities that represent the state of a vehicle, comprising the steps of:
   detecting a yaw rate and vehicle speed;
   calculating an equation by eliminating either one of unknown quantities of a front wheel cornering power and a rear-wheel cornering power from two equations, including said unknown quantities, comprising an equation of equilibrium for the force in the lateral direction of the vehicle and an equation of equilibrium for the moment around the vertical axis of the vehicle, and calculating a vehicle speed in the lateral direction using said equations; and
   calculating a vehicle body sideslip angle using said vehicle speed in the lateral direction.

4. A method for estimating quantities that represent the state of the vehicle according to claim 3, comprising the steps of:
   detecting the lateral acceleration; and
   changing either said front wheel cornering power or said rear wheel cornering power, whichever has not been eliminated, based on said lateral acceleration.

5. A method of estimating quantities that represent the state of a vehicle, comprising the steps of:
   detecting a yaw rate and vehicle speed; and
   calculating an equation by eliminating either one of unknown quantities of a front wheel tire lateral force or the rear-wheel lateral force from two equations, including said unknown quantities, comprising an equation of equilibrium for the force in the lateral direction of the vehicle and an equation of equilibrium for the moment around the vertical axis of the vehicle, and calculating a vehicle body sideslip angle using said obtained equation.

6. A method of estimating the quantities that represent a state of a vehicle, comprising the steps of:
   detecting a yaw rate and vehicle speed;
   calculating an equation by eliminating either one of unknown quantities of variables that determine the sideslip angle of the vehicle body and the characteristics of the front wheels and variables that determine the characteristics of the rear-wheels from two equations, including said unknown quantities, comprising an equation of equilibrium for the force in the lateral direction of the vehicle and an equation of equilibrium for the moment around the vertical axis of the vehicle, and calculating a vehicle body sideslip angle using said obtained equation.

7. A method for estimating the quantities that represent the state of the vehicle according to claim 6, comprising the steps of:
   calculating a value related to said vehicle body sideslip angle by integrating the differential value of the value related to said vehicle body sideslip angle; and
   calculating a differential value of a value related to said vehicle body sideslip angle in present processing using the value related to said vehicle body sideslip angle calculated in previous processing.

* * * * *